United States Patent [19]

Mon

[11] Patent Number: 4,995,269
[45] Date of Patent: Feb. 26, 1991

[54] VORTEX FLOWMETER HAVING AN ASYMMETRIC CENTER BODY

[75] Inventor: George Mon, Potomac, Md.

[73] Assignee: The United States of America as represented by the Secretary of the Army, Washington, D.C.

[21] Appl. No.: 491,805

[22] Filed: Mar. 8, 1990

[51] Int. Cl.$^5$ .............................................. G01F 1/32
[52] U.S. Cl. ................................................. 73/861.22
[58] Field of Search ............ 73/861.22, 861.23, 861.24

[56] References Cited

U.S. PATENT DOCUMENTS

| | | | |
|---|---|---|---|
| 3,759,096 | 9/1973 | White | 73/861.22 |
| 4,312,237 | 1/1982 | Thorne et al. | 73/861.22 |
| 4,699,012 | 10/1987 | Lew et al. | 73/861.24 |

Primary Examiner—Herbert Goldstein
Attorney, Agent, or Firm—Saul Elbaum; Paul S. Clohan

[57] ABSTRACT

A flow measuring apparatus having a flow tube with an asymmetrical blunt body rigidly mounted on at least one end in a stream of flowing fluid contained within the flow tube so as to form vortices downstream of said asymmetrical blunt body at low Reynolds numbers. A laminar proportional amplifier is used for amplifying the pressure variations caused by the vortices, either a microphone or a pressure transducer is used for converting the amplified pressure variations to an electrical output signal, and a signal conditioner and read out is used for converting the output signal into a rate of flow of the stream of flowing fluid.

8 Claims, 2 Drawing Sheets

VORTEX FLOWMETER HAVING AN ASYMMETRIC CENTER BODY

RIGHTS OF THE GOVERNMENT

The invention described herein may be manufactured, used and licensed by or for the United States Government for Governmental Purposes without payment to me of any royalty thereon.

BACKGROUND OF THE INVENTION

The present invention relates to flowmetering equipment and, in particular, to a flowmeter utilizing an asymmetric center body and a laminar proportional amplifier.

Numerous arrangements have been proposed by those skilled in the art which exploit the phenomenon of the Karman vortex street in order to measure fluid flowrates. More than a decade ago W. G. Bird devised an arrangement in which a pivoted vane-like element was positioned downstream of a vortex shedding body. Flowrate was measured by detecting the frequency of pivotal oscillation of the element. Later, A. E. Rodely recognized that a suitable dimensioned bluff body, having a base surface facing fluid flow and downstream surfaces to control oscillatory flow, would produce vortex shedding free of intermittency. In this arrangement, a temperature sensitive sensor situated outside the wake generated by the bluff body detects vortex shedding and produces electrical pulses proportional to the flow rate. The sensor is mounted separately in the pipeline wall and the probe-like sensor is positioned in the low turbulence flow zone outside of the wake.

Improved versions of the Rodely bluff body flowmeter generally detect vortex shedding in the high turbulence flow zone immediately downstream of the base surface of the bluff body. While these arrangements represent significant contributions to the state of the art, none has generally been suitable for measuring the flowrate of fluids at very low and very high Reynolds numbers. The frequency with which vortices are shed in a Karman vortex street behind a blunt body is dependent on the flow velocity, which is, in turn, a function of the Reynolds number R of the fluid, which is given by the equation:

$$R = \rho V D / \mu$$

where D = the cross-sectional width of the blunt body, V = the velocity of the fluid, $\rho$ = the density of the fluid and $\mu$ = the viscosity of the fluid.

The best type of flowmeter would be one that would measure flow rates from very low to very high Reynolds numbers. In the past, this has been difficult to achieve. It has been observed that a regular Karman vortex street can be generated behind a blunt body only when the Reynolds number of the fluid is in the range of about 60 to 5,000. At Reynolds numbers below 60, the flow around the body is laminar and no vortices are formed; at Reynolds numbers above 5,000, there is complete turbulent mixing which completely covers the Karman street. Most flowmeters are therefore designed to operate at Reynolds numbers between 500 and 5,000.

OBJECTS AND SUMMARY OF THE INVENTION

The primary object of this invention is to provide a vortex flowmeter containing an asymmetrical center body to enhance the vortex shedding at low Reynolds numbers and to enhance the strength of the vortices at high Reynolds numbers.

A further object of this invention is to provide a vortex flowmeter that has an operating range of three to four times that of a conventional vortex flowmeter.

A still further object of this invention is to provide a vortex flowmeter in which a Laminar Proportional Amplifier is used to amplify very small pressure signals at low Reynolds numbers.

Many vortex flowmeters have been designed and used extensively in industry. All existing vortex flowmeters have a symmetrical blunt body in their designs. Even though the vortex flowmeters has become a very useful tool in flow measurements, its dynamic range is limited because of high viscous damping at low Reynolds numbers and high turbulent mixing noise at high Reynolds numbers. To overcome this limitation, the present invention provides an asymmetric blunt body as a replacement for the conventional symmetrical body in the design of the vortex flowmeter. An asymmetrical blunt body will induce vortex shedding at a lower Reynolds number than that of a symmetrical body and, at the same time, the strength of the vortices will be increased. As a result, the useful range will be extended in the turbulent flow regime. The dynamic range of the vortex flowmeter can thus be improved by a factor of three to four without difficulty.

DETAILED DESCRIPTION OF THE PREFERRED EMBODIMENTS

Figure 1:
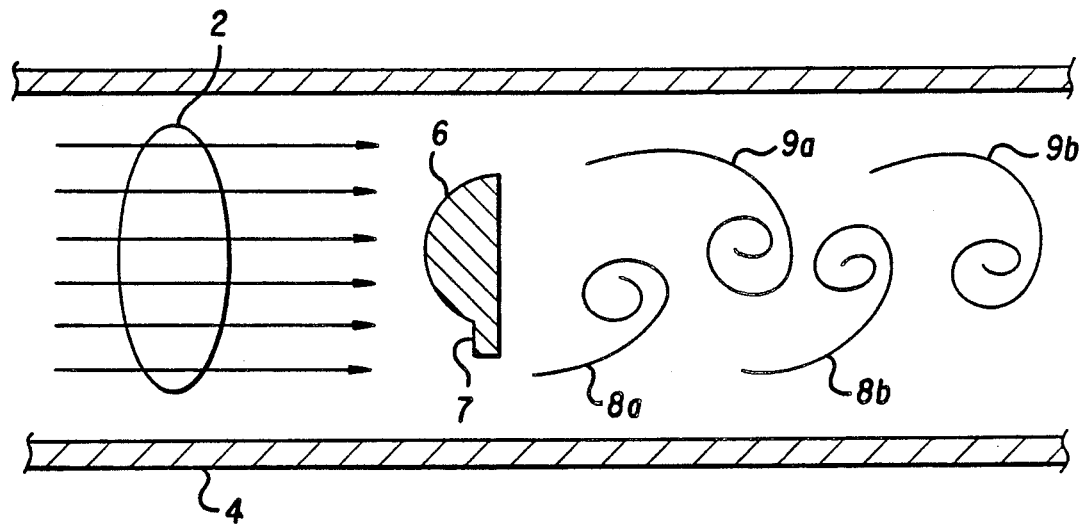
FIG. 1 is a transverse sectional view of a flowmeter flow tube having an asymmetrical center body according to the present invention.

Referring now to FIG. 1, a transverse sectional view of a flowmeter flow tube is shown. Flow tube 4, well known in the art, contains fluid flow 2, in the conventional manner. Located within flow tube 4 in an approximate central location is blunt body 6. Unlike conventional blunt bodies used in the art which have been symmetrical, blunt body 6 is asymmetrical about its central axis. In this case, a tab or extension 7 is added to one side of blunt body 6 thus causing it to be asymmetrical. Although a hemispherical blunt body with a tab is shown in FIG. 1, any asymmetrical shape may be used, depending upon the particular fluid flow characteristics involved.

Figure 2:
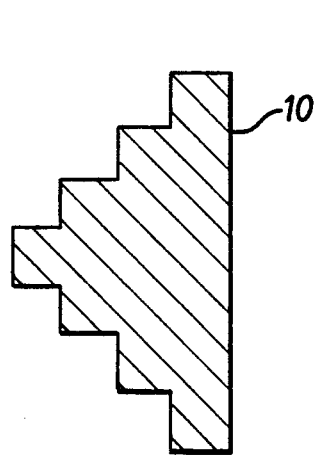
FIG. 2 is a cross section of a symmetrical blunt body.
Figure 3:
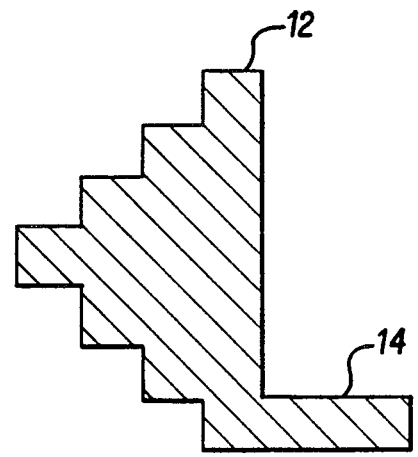
FIG. 3 is a cross section of an asymmetrical blunt body.

Analysis of the fluid flow past asymmetric bodies was conducted using a software program called FLUENT, version 2.9, created by Creare Inc. This analysis showed that flow past symmetrical bodies behaved in the expected normal manner, while flow past asymmetrical bodies exhibited flow oscillation on the downstream portion behind the asymmetrical body at much lower flow velocities and improved performance at high flow velocities. For example, when computer analysis is performed on the symmetrical blunt body shown in FIG. 2, the flow around symmetrical blunt body 10 is uniform up to a flow velocity of 7.60 ft/sec. In contrast, when an analysis is conducted on the asymmetrical blunt body shown in FIG. 3, the flow characteristic is quite different. In this case, blunt body 12 is very similar to blunt body 10 with the exception of a trailing edge portion 14, thus making blunt body 12 asymmetrical. The computer analysis shows that the flow around body 12 starts to oscillate at a flow velocity of 7.49 ft/sec. Based one these simulations, it is anticipated that distinct vortices will form at a low Reynolds number of around 30, and at a high Reynolds number of around 10,000 the vortices will be distinct enough to still be useable for flow measurement purposes.

Figure 4:
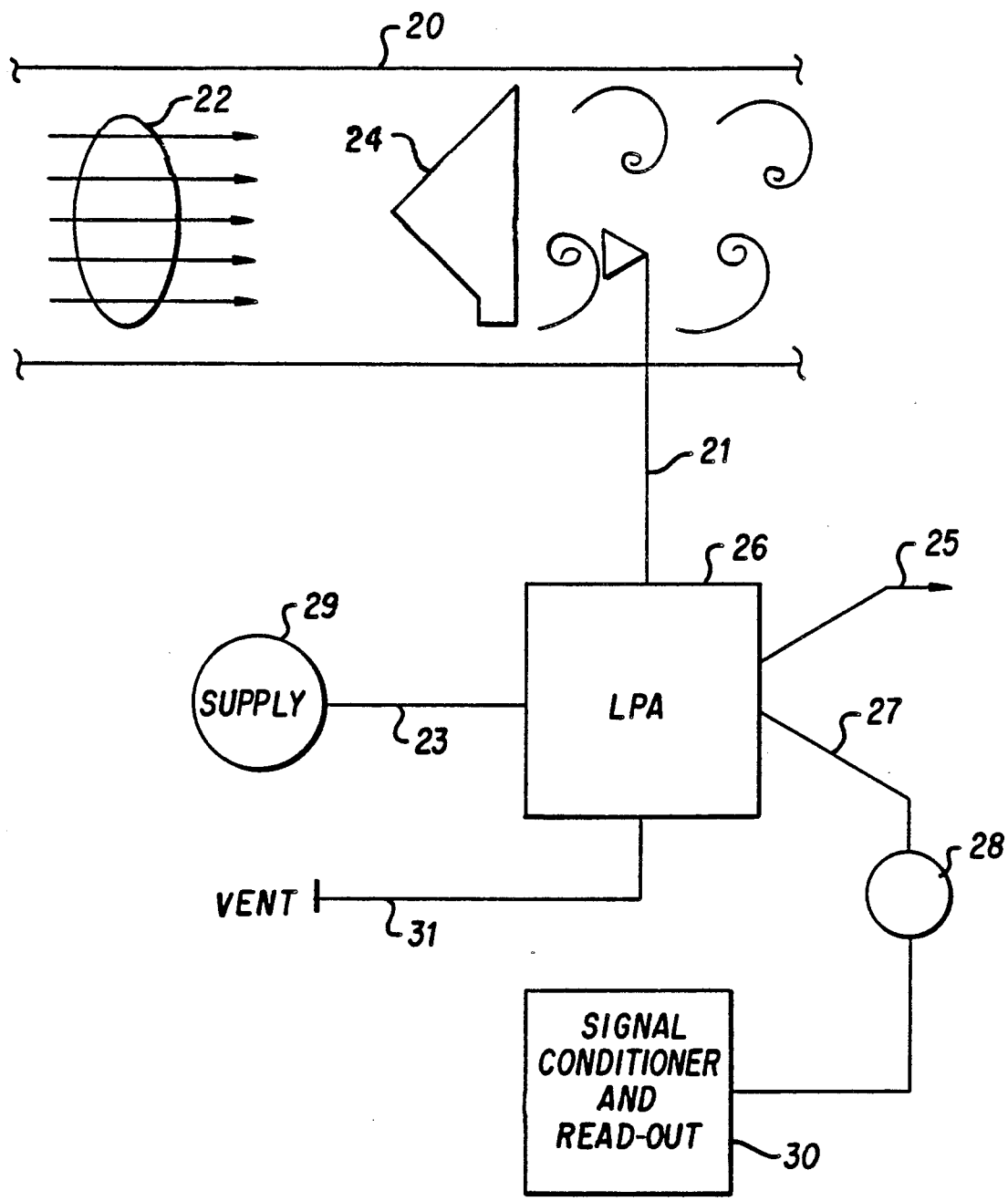
FIG. 4 is a schematic of a vortex flowmeter according to the present invention.

Referring now to FIG. 4, a schematic diagram of a new vortex flowmeter according to the present inventive concept is shown. In this new vortex flowmeter, a Laminar Proportional Amplifier (LPA) is used to amplify the output signal. By way of example, only one LPA is shown schematically although it is well known in the art to "stage" LPA's into a gainblock, and the construction of LPA's is well known in the prior art. LPA 26 has an inlet connection 21 leading to its nozzle, an amplifier input connection 21 leading to one of the control ports and two output connections 25 and 27 leading from the fluid receivers. A fluid supply 29 communicates with inlet 23 and a vent connection 31 may be provided. In a typical LPA, the input signal transmitted through inlet connection 21 is generally injected into only one input port of the LPA, in this example input port 21. The other input port is generally grounded or otherwise balanced. The signal travels through the LPA, is amplified by the LPA, and exits from output connection 27 as an output signal.

The output from LPA 26 can be monitored by using an inexpensive microphone or alternately a pressure transducer. This new flowmeter consists of a flow tube 20 containing flow 22, an asymmetrical center body 24, LPA 26, a microphone 28 and a signal conditioning and read-out system 30. Microphone 28 can be replaced by a pressure transducer if desired. When fluid flow 22 enters flow tube 20 and flows past asymmetric center body 24, a vortex street is formed on the downstream side of asymmetric center body 24 as shown in FIG. 4. The frequency of shedding is directly related to the fluid flow velocity which, in turn, is a function of the flowrate and the geometries of flow tube 20 and asymmetric center body 24. For a given configuration, one can, then, determine the flowrate by monitoring the frequency of shedding. The output frequency can be monitored by using microphone 28, or by a pressure transducer. The frequency signal is, then, converted to an analog signal by methods well known in the art such as by using a signal conditioner that is a frequency to voltage converter. The output from the voltage converter can then be scaled to give a direct reading of the flowrate.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A Karman vortex street generating device comprising:
   a flow tube;
   an asymmetrical blunt body rigidly mounted on at least one end in a stream of flowing fluid contained within said flow tube so as to form vortices downstream of said asymmetrical blunt body, said asymmetrical blunt body comprising the shape of a hemisphere with a tab at one side.

2. A Karman vortex street generating device comprising:
   a flow tube;
   an asymmetrical blunt body rigidly mounted on at least one end in a stream of flowing fluid contained within said flow tube so as to form vortices downstream of said asymmetrical blunt body, said asymmetrical blunt body comprising the shape of a pyramid with a tab at one side.

3. A flow measuring apparatus comprising:
   a flow tube;
   an asymmetrical blunt body rigidly mounted on at least one end in a stream of flowing fluid contained within said flow tube so as to form vortices downstream of said asymmetrical blunt body;
   means for amplifying the pressure variations caused by said vortices;
   means for converting said amplified pressure variations to an eletrical output signal;
   means for converting said output signal into a rate of flow of said stream of flowing fluid;
   said asymmetrical blunt body comprising the shape of a hemisphere with a tab at one side.

4. A flow measuring apparatus comprising:
   a flow tube;
   an asymmetrical blunt body rigidly mounted on at least one end in a stream of flowing fluid contained within said flow tube so as to form vortices downstream of said asymmetrical blunt body;
   means for amplifying the pressure variations caused by said vortices;
   means for converting said amplified pressure variations to an electrical output signal; means for converting said output signal into a rate of flow of said stream of flowing fluid;
   said asymmetrical blunt body comprising the shape of a pyramid with a tab at one side.

5. A flow measuring apparatus comprising:
   a flow tube;
   an asymmetrical blunt body rigidly mounted on at least one end in a stream of flowing fluid contained within said flow tube so as to form vortices downstream of said asymmetrical blunt body;
   means for amplifying the pressure variations caused by said vortices;
   means for converting said amplified pressure variations to an electrical output signal;
   means for converting said output signal into a rate of flow of said stream of flowing fluid;
   said means for amplifying the pressure variations caused by said vortices comprising at least one laminar proportional amplifier.

6. The device of claim 5 wherein said means for converting said amplified pressure variations to an electrical output signal comprises a microphone.

7. The device of claim 5 wherein said means for converting said amplified pressure variations to an electrical output signal comprises a pressure transducer.

8. The device of claim 5 wherein said means for converting said output signal into a rate of flow of said stream of flowing fluid comprises a signal conditioner and read-out.

* * * * *